United States Patent
Wegener et al.

(10) Patent No.: US 10,768,597 B2
(45) Date of Patent: Sep. 8, 2020

(54) METHOD AND CONTROLLER FOR FLEXIBLE PROCESS CONTROL

(71) Applicant: Phoenix Contact GmbH & Co. KG, Blomberg (DE)

(72) Inventors: Friedrich Wegener, Vahlbruch (DE); Friedrich Hackl, Horn-Bad Meinberg (DE); Carsten Kolodziej, Steinheim (DE); Robert Wilmes, Detmold (DE)

(73) Assignee: Phoenix Contact GmbH & Co., KG, Blomberg (DE)

( * ) Notice: Subject to any disclaimer, the term of this patent is extended or adjusted under 35 U.S.C. 154(b) by 472 days.

(21) Appl. No.: 15/133,258

(22) Filed: Apr. 20, 2016

(65) Prior Publication Data

US 2016/0313718 A1      Oct. 27, 2016

(30) Foreign Application Priority Data

Apr. 21, 2015   (DE) .......................... 10 2015 106 116

(51) Int. Cl.
*G05B 19/05* (2006.01)
*G05B 19/042* (2006.01)

(52) U.S. Cl.
CPC ............ *G05B 19/0426* (2013.01); *G05B 2219/13152* (2013.01); *Y02P 90/265* (2015.11)

(58) Field of Classification Search
None
See application file for complete search history.

(56) References Cited

U.S. PATENT DOCUMENTS

| 6,901,298 | B1 * | 5/2005 | Govindaraj | .......... | G05B 19/058 700/21 |
| 6,925,337 | B2 * | 8/2005 | Roe | .................... | G05B 19/0426 700/19 |

(Continued)

FOREIGN PATENT DOCUMENTS

| DE | 10144427 A1 | 4/2003 |
| DE | 10157539 A1 | 6/2003 |

(Continued)

OTHER PUBLICATIONS

Nillesen et al. "A Very Flexible DSP-Based Controller for On-Line Test and Control of Industrial Processes", 2000 IEEE, 6 pages.*

(Continued)

*Primary Examiner* — Van H Nguyen
(74) *Attorney, Agent, or Firm* — Kaplan Breyer Schwarz, LLP

(57) ABSTRACT

To simplify and/or more flexibly implement a process control by means of a control device, a method is provided for process control in which at least one first and one second data processing module are executed by a control device during operation, wherein an operating program of the control device automatically implements an exchange of data between assigned data objects of the first and the second data processing module, and wherein the assignment between the data objects of the first and the second data processing modules is modified during operation of the control device in order to modify the process control. In addition, the control device is designed to carry out the method, as well as an operating program for such a control device, which can particularly be saved on a data storage device.

8 Claims, 4 Drawing Sheets

(56) References Cited

U.S. PATENT DOCUMENTS

| | | | |
|---|---|---|---|
| 9,229,440 B2* | 1/2016 | Blei | G05B 19/054 |
| 9,541,918 B2* | 1/2017 | Shi | G05B 19/418 |
| 10,317,860 B2* | 6/2019 | Nakagawa | G05B 15/02 |
| 2003/0033030 A1 | 2/2003 | Naismith et al. | |
| 2006/0190106 A1* | 8/2006 | Kay | G05B 19/042 |
| | | | 700/86 |
| 2007/0157149 A1 | 7/2007 | Grzonka et al. | |
| 2008/0140888 A1 | 6/2008 | Blair et al. | |
| 2010/0094438 A1* | 4/2010 | Drebinger | G05B 19/056 |
| | | | 700/87 |
| 2010/0125344 A1* | 5/2010 | Gaub | G05B 19/0428 |
| | | | 700/4 |
| 2013/0144406 A1* | 6/2013 | Blei | G05B 19/054 |
| | | | 700/28 |
| 2015/0227128 A1* | 8/2015 | Kitamura | G05B 19/05 |
| | | | 700/86 |
| 2016/0070246 A1* | 3/2016 | Nakagawa | G06F 9/44526 |
| | | | 700/11 |
| 2016/0116910 A1* | 4/2016 | Lutz | G05B 19/4185 |
| | | | 700/19 |

FOREIGN PATENT DOCUMENTS

| | | |
|---|---|---|
| DE | 102004007229 A1 | 9/2005 |
| DE | 69921305 T2 | 10/2005 |
| DE | 102006010500 B4 | 1/2009 |
| DE | 102009009293 A1 | 8/2010 |
| DE | 102010026494 A1 | 1/2012 |
| DE | 102010053485 A1 | 6/2012 |
| EP | 2388693 A1 | 11/2011 |
| EP | 2407840 A1 | 1/2012 |
| EP | 2687930 A1 | 1/2014 |
| JP | 2002-132501 A | 5/2002 |
| JP | 2004-199528 A | 7/2004 |
| JP | 2005-326909 A | 11/2005 |

OTHER PUBLICATIONS

"Office Action", issued in counterpart German Patent Application No. 10 2015 106 116.3, dated Aug. 27, 2015.

* cited by examiner

METHOD AND CONTROLLER FOR FLEXIBLE PROCESS CONTROL

CROSS-REFERENCE TO RELATED APPLICATIONS

German patent application no. 10 2015 106 116.3, filed on Apr. 21, 2015, is incorporated herein by reference in its entirety.

FIELD OF THE INVENTION

The invention relates generally to automation technology, and specifically to a method and a control device, wherein the control device is connected to at last one process device, the same designed as an input and/or output device, via a communication network, for the purpose of process control.

BACKGROUND OF THE INVENTION

In the field of automation, programmable logic controllers (PLCs) are widely used for controlling or regulating a machine or a system, wherein the PLC is connected to the machine or system particularly by means of sensors and actuators. The PLC can be connected directly to the sensors and actuators via inputs and outputs, or via a communication network such as a bus system, for example. The process control is performed by means of an application program executed by the PLC, wherein an operating program of the PLC, which is also called firmware, ensures that the application has access to updated process data.

Application programs for programmable logic controllers are typically written using one of the programming languages defined in the IEC61131-3 standard. When the control program is written pursuant to IEC61131-3 in an engineering system, program variables are assigned to process data objects via which access to input and output data, and therefore to signals from sensors, as well as control signals for actuators, is made possible. After the control program is written, with assignment of the program variables, the PLC-specific code is generated by compiling, and is transmitted to the target system in question.

For the assignment of the program variables to the process data to be changed, the control program in the engineering system must be accordingly modified and re-compiled in order to generate accordingly modified PLC-specific code. For instance, to assign the I/O channel of another module to a program variable, the control project must be adapted with an engineering tool and reloaded into the PLC. This may be inflexible and difficult in certain system startup scenarios.

SUMMARY OF THE INVENTION

The problem addressed by the invention is therefore that of showing a way to make it possible to design a process control implemented by a control device, particularly a PLC, more simply and/or flexibly.

The technical problem named above is addressed, firstly, by the illustrative embodiment of the present invention.

According to the same, a method for process control by means of a control device is provided, wherein said control device is connected to at least one process device, wherein at least one first and one second data processing module are executed by the control device during operation, and wherein an operating program of the control device automatically implements an exchange of data between assigned data objects of the first and the second data processing module. In addition, in the method, the assignment between the data objects of the first and the second data processing modules is modified during operation of the control device in order to modify the process control. In other words, the assignment between the data objects is modified while the control device is executing its control tasks, and accordingly influences the process; and in particular the control program which is in the process of execution on the control device is not interrupted for the modification of the assignment between the data objects. A modification of the assignment between data objects in this case can include the creation, modification, or removal of individual assignments.

The first data processing module is preferably a control program executed by the control device, the data objects of which are formed by program variables, wherein one memory area in a data memory of the control device is reserved for each program variable during the execution of the control program. The control device is typically designed as a programmable logic controller (PLC), and the control program is a control program written using one of the programming languages defined in the IEC61131-3 standard. The second data processing module can advantageously be a communication interface of the control device for communication with process devices, the data objects of which are formed by process data objects managed by the operating program, wherein one memory area in a data storage device of the control device is reserved for each process data object during the operation of the control device. This enables a flexible assignment between program variables of a control program and process data objects without the need to interrupt the control program as it runs.

A data processing module, however, can also be any other suitable type of software and/or hardware module which produces and/or consumes data during operation of the control device, such as an application programmed in a high level language such as C, a mathematical model, a real-time communication channel, or a non-real-time communication channel—for example for OPC communication.

A data processing module is an entity created during the operation of the control device, which produces and/or consumes data, and which for this purpose has data objects which can at least partially be assigned to other data objects of another data processing module. In the following, data processing modules are also referred to as domains of the control device. A data processing module is typically executed on the control device as a thread, and the thread management is executed by an operating program—also called firmware—of the control device.

The creation, modification, or removal of an assignment between a data object of the first and a data object of the second data processing module is preferably carried out by means of an assignment function provided by the operating program of the control device. It is particularly advantageous that the assignments between the data objects of the data processing module are determined in at least one of the assignments files saved in the control device, the same comprising a list of the respectively assigned data objects.

A core concept of the invention is that of making it possible, by means of special assignment functions provided as firmware functions or firmware services, to flexibly adapt the assignment between data objects, for example between program variables of a control program and process data objects, which is fixed during the operation of a control device according to the prior art, wherein each updated assignment of the data objects is particularly established in at least one assignment function saved in the control device. It is particularly advantageous that an assignment module, also called an assignment manager in the following, is executed on the control device and manages the assignments file or assignments files, and executes the corresponding firmware functions upon a modification of an assignments file in order to implement the modified assignments, wherein the execution of the firmware functions particularly results in the modification of pointers to memory areas. Therefore, the invention enables a flexible assignment of data objects to memory areas by adding corresponding functions to expand the firmware of a control device.

At least one of the data processing modules advantageously comprises information on assignable data objects and/or information on assignments of data objects, wherein the at least one assignments file is generated according to this information during the startup of the control device. In particular, this can be executed automatically by the assignment module.

It is particularly advantageous that the current assignments file is replaced by a modified assignments file for the purpose of modifying the assignment of data objects. This has the particular advantage that the assignment of data objects can be modified in a simple manner by means of an external operating device.

To this end, a current assignments file can be transmitted by a control device to a separate operating device, the received assignments file can be modified on the operating device, the modified assignments file can be transmitted by the operating device back to the control device, and as a response to the receipt of the modified assignments file, the data objects can be assigned by the control device during ongoing operation according to the modified assignments file.

In addition, a modification of the assignment between data objects during ongoing operation of the control device can also be implemented by a data processing module executed by the control device, wherein the assignments file is preferably modified for this purpose by the data processing module.

If the current assignments file is replaced during the modification of the assignment of data objects by a modified assignments file, it is advantageous that the current assignments file is saved as a previous version in the control device, wherein a function is preferably provided to make modifications reversible by accessing a previous version of the current assignments file and providing the same as a new, modified assignments file—that is, a previous version of the current assignments file is re-activated. For this purpose, a previous version or a plurality of previous versions of the current assignments file can be saved in the control device. By way of example, a maximum number of previous versions to be saved can be pre-specified, wherein in every case where this number is exceeded, the older previous version can be overwritten. In addition, only two assignments files, by way of example, can be saved, of which one is active and the other is inactive, wherein a modified assignments file is saved on the controller as the inactive assignments file, and is activated via a service, wherein a further service can be provided to reverse modification by re-activating the currently inactive assignments file without a modified assignments file having been provided.

The assignment of the data objects according to a modified assignments file is advantageously executed by the assignment module, by calling the assignment function provided by the operating program.

The embodiments of a method for process control described above can be advantageously combined in any manner.

The technical problem named above is further addressed by the illustrative embodiment of the present invention.

According to the same, a control device is provided which is designed to execute the method described above for process control. For this purpose, the control device can be connected to at least one process device, and has at least one microprocessor, one first memory with an operating program saved therein, and at least one second memory with a first and a second data processing module saved therein, wherein the control device is designed for the purpose of executing the at least one first and one second data processing module during operation, and wherein the operating program is designed for the purpose of automatically implementing an exchange of data between assigned data objects of the first and the second data processing module, and wherein the control device is designed for the purpose of modifying the assignment between the data objects of the first and the second data processing modules during ongoing operation in order to implement a modification of the process control.

In addition, all of the embodiments of such a control device described above in the context of the method for process control also are within the scope of the invention.

The technical problem named above is also addressed by the illustrative embodiment of the present invention, according to which an operating program is provided which is designed to execute a method described above for process control when it is executed on a control device as described above, as well as a data storage device having such an operating program saved thereon.

BRIEF DESCRIPTION OF THE DRAWINGS

The invention is described below in greater detail in the context of preferred embodiments, and in reference to the attached drawings. The same or similar parts are identified by the same reference numbers in the drawings, in which.

DETAILED DESCRIPTION

Figure 1:
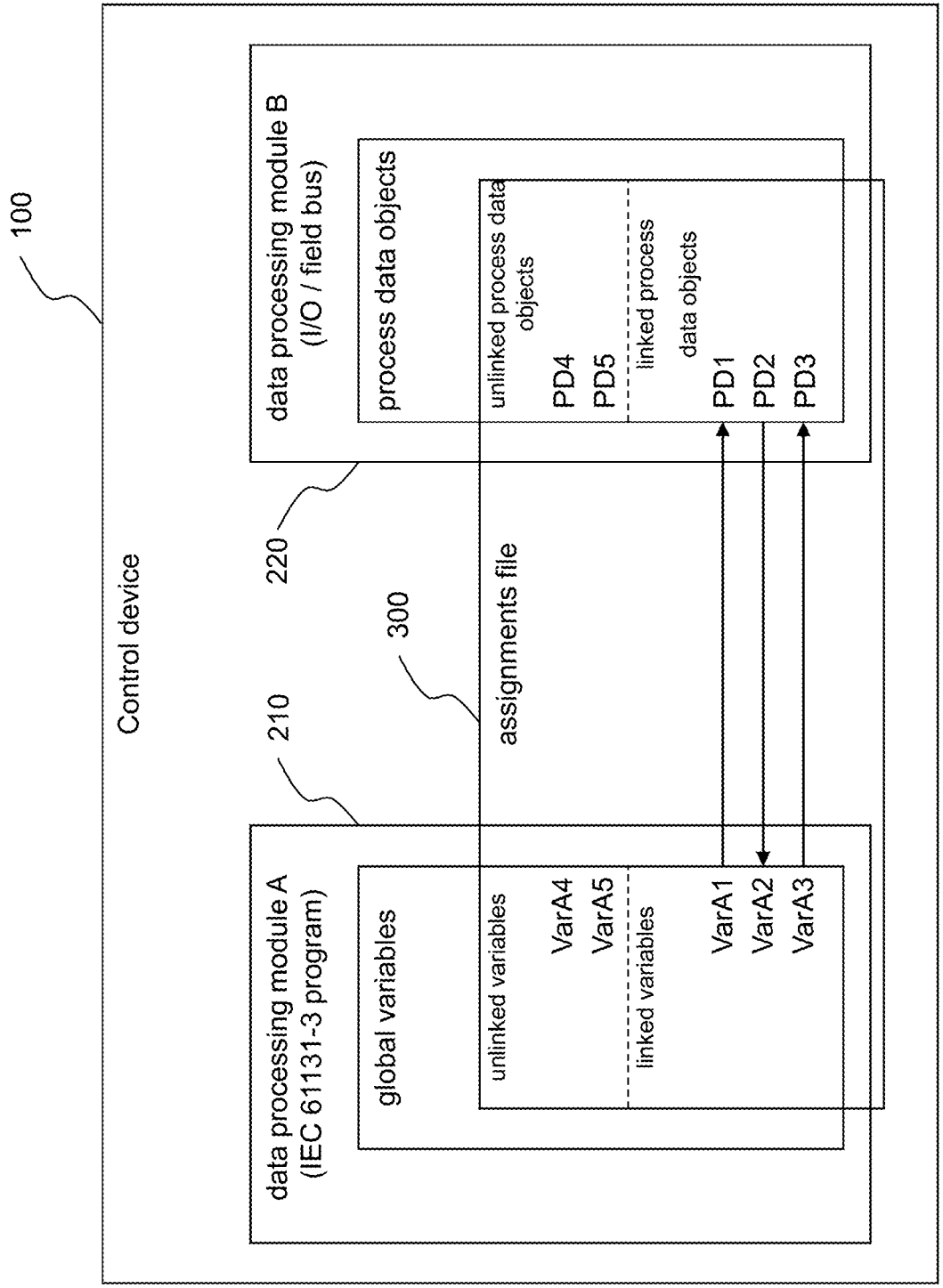
FIG. 1 shows a schematic illustration of the principle on which is based a method according to the invention for process control.

FIG. 1 shows the basic principle of the invention, which is that of modifying the assignment between data objects of different data processing modules of a control device 100 during ongoing operation, by means of modifying an assignments file 300 saved in the control device 100. FIG. 1, a control program 210 written in a programming language pursuant to IEC 61131-3, is executed by the control device 100 as a first data processing module A. As a second data processing module B, the control device 100 has a communication interface 220 which allows access to process data by means of process data objects. Process data objects of the communication interface 220 are assigned to program variables of the control device 210 via the assignments file 300, wherein the assignment of the data objects can be modified during ongoing operation by modifying the assignments file 300. The control device 100 is preferably designed as a programmable logic controller, which is abbreviated below as "controller".

The assignments file 300 comprises a list of respectively assigned data objects, and can also include data objects which are currently not assigned to other data objects, but which can be assigned. In the illustrated example, the assignments file 300 comprises the unassigned program variables VarA4 and VarA5, as well as the unassigned process data objects PD4 and PD5, and also an assignment between the program variable VarA1 and the process data object PD1, an assignment between the program variable VarA2 and the process data object PD2, and an assignment between the program variable VarA3 and the process data object PD3. The assignments file can also comprise information concerning the direction in which data is exchanged between the data objects. This is indicated in FIG. 1 by arrows. The data objects can be referenced in the assignments file via identifiers, or via the addresses of the memory area reserved for the respective data object.

So that the program variables of the control programs 210 can be flexibly assigned to other data objects during operation, the control project is preferably prepared during the engineering phase for a flexible assignment of variables to process data objects. In other words, an option is established for the later modification of the assignments—for the project as a whole or for individual devices.

Either an assignment can be made in the engineering tool itself, or it can be made later during the startup or during the operation. Rather than variables of the control program 210, variable elements or a structure or an array can be assigned to a process data object. Also, complete structures or arrays can be assigned to a process data object. In the case of a serial interface module, a variable array of 12 bytes, by way of example, can be assigned to a process data object of 12 bytes.

During the startup phase, an external tool can read and modify the assignment and/or assignments between variables and process data objects from the controller 100, and reload the same to the controller 100, without the need for the same to be restarted. It is not necessary for the control project to be generated anew in the engineering tool—such as the engineering software PCWORX from Phoenix Contact, for example—and transmitted to the controller. Rather, the changes are implemented by the external tool during the runtime of the controller 100.

As a result, it is advantageously possible for assignments to be modified and regenerated during the startup, without the user project needing to be modified, and without the need to access the user project. The controller 100 performs the modifications without exiting run mode.

One or multiple modifications of individual assignments can be written to the controller 100 and activated on the same via a service. Accordingly, the assignments file 300 is modified on the controller 100. As such, assignment modifications can also be initiated from the user program 210, indicated in FIG. 1 as data processing module A. In this way, the described functions can be advantageously integrated into any software tools.

Assignments of data objects between different domains on the controller 100, such as process data to variables, for example, can be set, modified, or deleted via firmware services. These services can be used during the runtime of the controller 100. A service used for the assignment of two data objects to each other can also be called by a domain on the controller 100. In the event that, by way of example, a new input module or output module with further process data has been added to the bus configuration, the bus configuration domains can report the new data objects and assign other data objects, such as variables from the control program 210, via the assignment service.

The assignment service can particularly be called by an assignment manager, wherein this assignment manager is a software module executed on the controller 100 which can receive and interpret one or multiple assignment lists, from an external tool, in the form of one or multiple assignments files. The interpretation results in the calling of multiple assignment services in order to assign a series of data objects. The interpretation of the assignments files and the calling of the firmware services likewise occurs without the need to halt the processing/function of the controller 100 or the individual domains 210 or 220. The assignment manager generates a current assignment list when there are modifications of assignments on the system, and saves the previously valid assignment list on the system as a backup. An external tool can upload the current assignment list in the form of a file. The external tool can accordingly modify the file and transmit the same back to the system. Upon a request by the user via the external tool, the controller can activate a saved assignment list belonging to one or multiple different domains. An undo function can be ensured for assignments in this way.

As an alternative, two assignment files can be managed on the controller—one active and one inactive. A modified assignments file is first written to the controller as an inactive list and then is activated via a service. In the event of an error, the user can switch the roles of the files via a further service—that is, the active file is made inactive and vice-versa.

Figure 2:
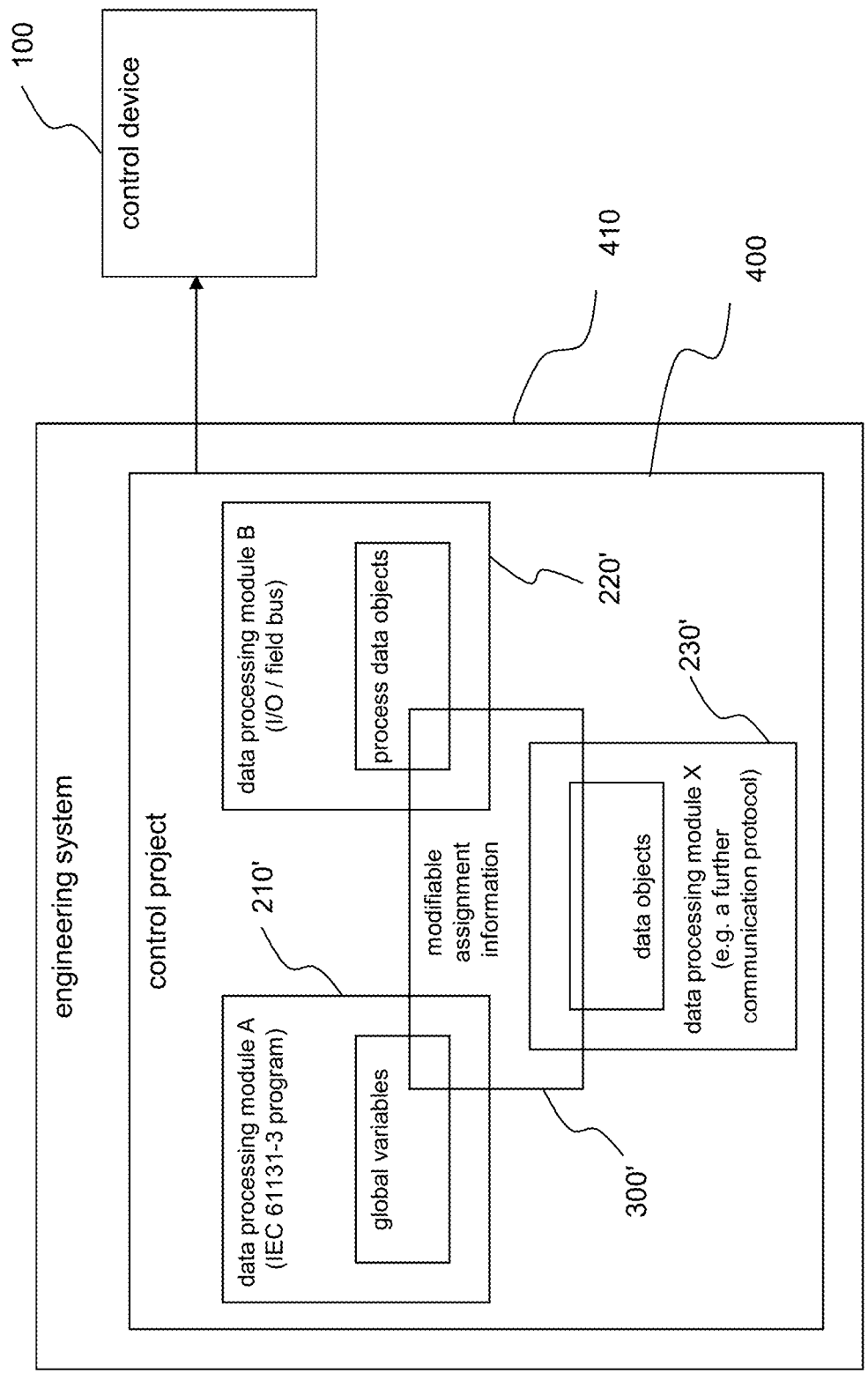
FIG. 2 shows a schematic illustration of a preferred embodiment of the invention, wherein data objects are determined by means of an engineering system during the creation of a control program, wherein the assignment of these data objects can be dynamically modified during the execution of the control program by the control device on which the control program is executed.

In the embodiment shown in FIG. 2, the user uses an engineering system 410 to generate an application program 210' in a user project 400, based on the IEC 61131-3 standard, which is indicated in FIG. 2 as data processing module A, and configures a network with input and output modules 220', the same having physical I/O points, indicated in FIG. 2 as data processing module B. The user defines global variables of the application program 210' which can be linked to physical I/O points for the access to process data. Inputs can be read and outputs written by the user program 210' via this linking. Variables and process data objects which are included for an assignment modification in runtime receive the corresponding property as an assignment. Put simply, the modification of the assignment results in a rewiring. The process data objects of the data processing module B are defined by an adjustable process data addressing specification—for example a channel addressing and station addressing. Additional data processing modules can also be generated or configured by the user. FIG. 2 accordingly illustrates an example of a further data processing module X, indicated with the reference number 230', which comprises data objects, by way of example, which enable access to data using a further communication protocol.

The user links global variables of the application program 210' in the engineering tool 410 with process data objects, wherein modifiable assignment information 300' is generated which contains all assigned and assignable process data objects and program variables, as well as optionally additional data objects of further data processing modules such as, by way of example, the data processing module 230'. All of the assignments between data objects can already be defined in the engineering tool 410; however, the assignments can also only be partially defined or initially not defined at all. The project 400 is then compiled and transmitted to the controller, wherein the assignment information 300' is saved in the controller as an assignments file 300. The controller 100 then switches the operating mode from stop to run.

Figure 3:
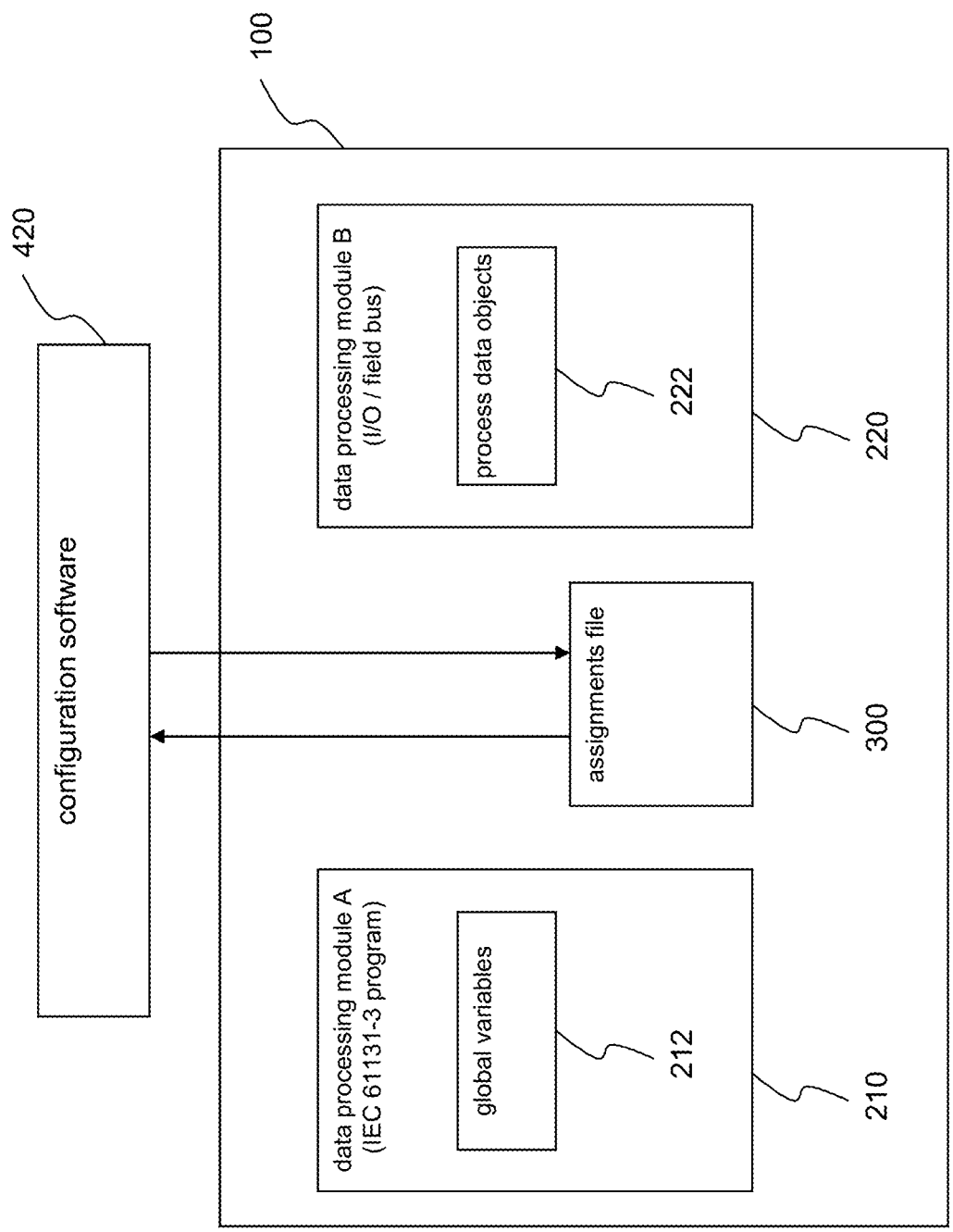
FIG. 3 shows a schematic illustration of a further preferred embodiment of the invention, wherein the assignment of data objects of a control program is modified during the execution of a control program, by means of configuration software, by modifying an assignments file saved on a control device.

As illustrated in FIG. 3, the user can read the assignments file 300 from the controller 100 using configuration software 410 during the runtime of the system and/or the controller 100. The assignments file 300 contains all assignable global variables 212, optionally with their assignment information—variables 212 to process data objects 222. In addition, the assignments file 300 contains all process data objects 222 configured in the user project 400. The user can modify the assignment between variables 212 and process data objects 222 in the configuration software 420; for example, he can assign a variable to another process data object, or delete an assignment. The configuration software 420 preferably performs a validation—for example with respect to data transmission direction, data size, or multiple assignments—when the user makes modifications. The modified assignments file is reloaded onto the controller 100 by the user from the configuration software 420.

The assignments are accepted by the controller 100 upon request, preferably by calling a firmware service, during runtime and without interrupting the user project. By means of the configuration software 410, the user can reactivate the previous assignments file on the controller 100 via an undo/redo function. The configuration software 420 can either be provided as software which can run independently, or can be embedded as a software component in other software tools, such as the engineering system 410 described above, or visualization software.

Assignments can also be carried out solely in the configuration software 420. In this case, the user does not define any assignments between global variables 212 and process data objects 222 in the engineering tool 410. The project is compiled and is transmitted to the controller 100. The controller 100 then switches the operating mode from stop to run. The user can read the assignments file 300 from the controller 100 using the configuration software 410 during the runtime of the system and/or the controller 100. The assignments file 300 contains all assignable global variables 212. In addition, the assignments file contains all process data objects 222 configured in the user project.

The user can undertake the assignment between variables 212 and process data objects 222 in the configuration software 420. The configuration software 420 validates the assignments as described above. The assignments file 300 is reloaded onto the controller 100 by the user from the configuration software 420. The assignments are accepted by the controller upon request, preferably by calling a firmware service, during runtime and without interrupting the user project.

Figure 4:
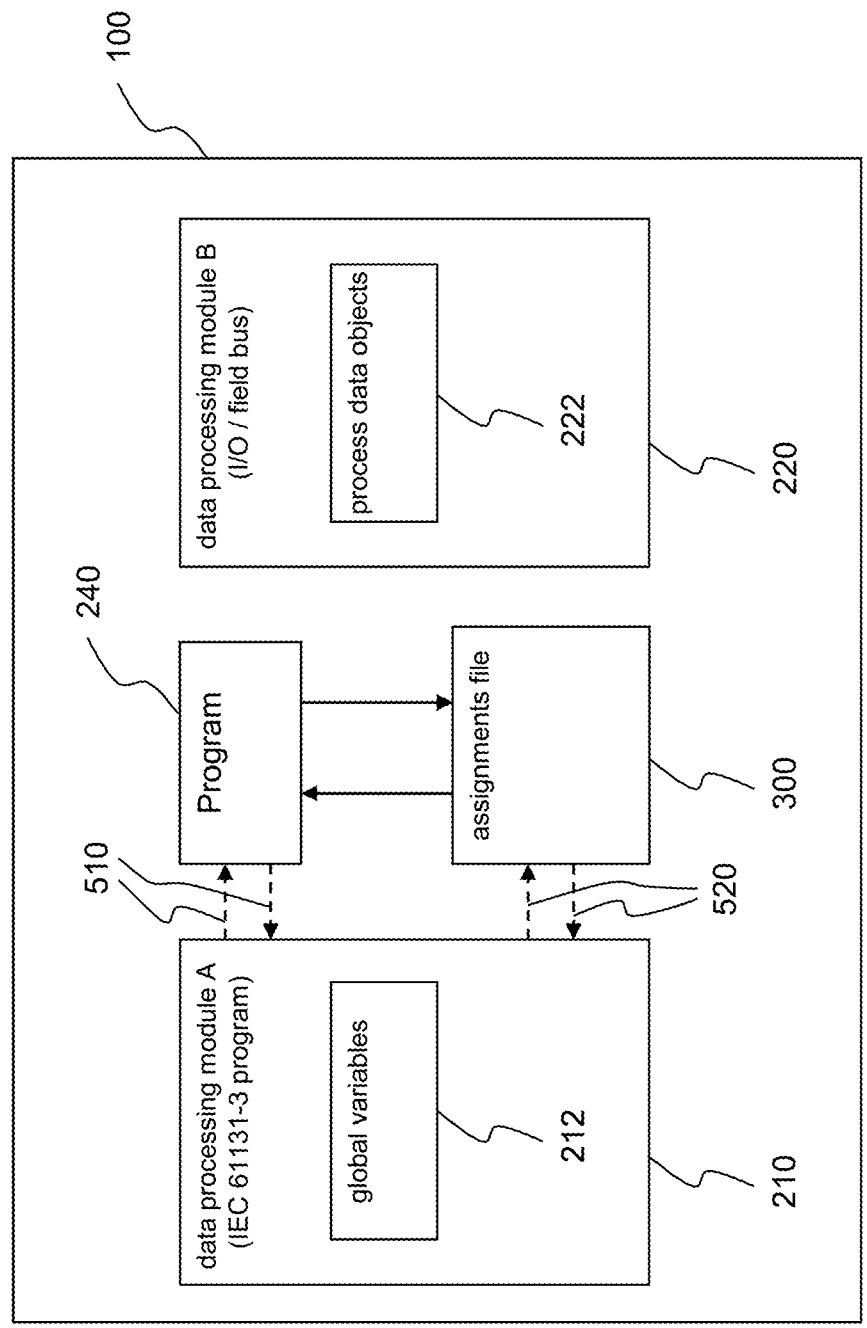
FIG. 4 shows a schematic illustration of yet another preferred embodiment of the invention, wherein the assignment of data objects of a control program is modified during the execution of the control program, by means of an application executed on the control device, by modifying an assignments file saved on a control device.

FIG. 4 illustrates a further embodiment in which data object assignment modifications are carried out via firmware services of the controller 100. This makes it possible for a modification of the assignments of data objects to also be carried out by a program 240 running on the controller 100. The program 240 executes a service on the controller 100 to read the current and possible assignments. The program 240 can modify or create new assignments via a further service. The assignments file 300 on the controller 100 is modified and/or updated by the service. The activation of the modified and new assignments on the controller 100 during runtime, and without interrupting the user project, can be performed by the program 240 via a further service.

The program 240 can also be called by functions or function blocks from the control program 210. As a result, the assignments can be altered from the control program 210 by means of the separate program 240. This is indicated in FIG. 4 by the dashed arrow 510.

As an alternative, the functionality of the program 240 can also be integrated into the control program 210. In other words, a modification of the assignments of data objects can also be carried out directly by a control program 210 running on the controller 100. This is indicated in FIG. 4 by the dashed arrow 520. To this end, the control program 210 can execute a service on the controller 100 to read the current and possible assignments, and can modify or create new assignments via a further available service, to thereby modify and/or update the assignments file 300 on the controller 100. The activation of the modified and new assignments on the controller 100 can be performed during runtime, and without interrupting the control program 210, by the control program 210 itself via a further service.

What is claimed is:

1. A method for process control, having a control device that is connected to at least one process device, wherein at least one first and one second data processing module are executed by the control device during operation, wherein an operating program of the control device automatically implements an exchange of data between assigned data objects of the first and the second data processing module and wherein the assignment between the data objects of the first and the second data processing modules is modified during the operation of the control device in order to modify the process control, wherein the assignment between the data objects is modified while the control device is executing its control tasks and influences the process, wherein:

the first data processing module is a control program executed by the control device, the data objects of which are formed by program variables, and wherein one memory area in a data memory of the control device is reserved for each program variable during the execution of the control program, and wherein:

the second data processing module is a communication interface of the control device for communication with process devices, the data objects of which are formed by process data objects managed by the operating program, and wherein one memory area in a data storage device of the control device is reserved for each process data object during the operation of the control device, wherein the assignments between the data objects of the data processing modules are determined in at least one of the assignments files saved in the control device, the same comprising a list of the respectively assigned data objects, and wherein:

the current assignments file is transmitted from the control device to a separate operating device, the received assignments file is modified on the operating device, the modified assignments file is transmitted from the operating device back to the control device, and as a response to the receipt of the modified assignments file, the data objects can be assigned by the control device during ongoing operation according to the modified assignments file.

2. The method according to claim 1, wherein the creation, modification, or removal of an assignment between a data object of the first and a data object of the second data processing module is carried out by an assignment function provided by the operating program of the control device.

3. The method according to claim 1, wherein at least one of the data processing modules comprises information on assignable data objects and/or information on assignments of data objects, and wherein the at least one assignments file is generated according to this information during the startup of the control device.

4. The method according to claim 1, wherein the current assignments file is replaced by a modified assignments file when the assignment of data objects is modified, and the current assignments the is saved as a previous version in the control device.

5. The method according to claim 1, wherein the assignment of the data objects according to a modified assignments file is executed by an assignment module by calling the assignment function provided by the operating program.

6. The method according to claim 1, wherein the assignment between data objects can be implemented by a data processing module during ongoing operation of the control device.

7. A control device which can be connected to at least one process device for the purpose of process control, the control device comprising:
 at least one microprocessor,
 at least one first memory with an operating program saved therein, and
 at least one second memory with a first and a second data processing module saved therein, wherein the control device executes the at least one first and one second data processing module during, operation, wherein the operating program automatically implements an exchange of data between assigned data objects of the first and the second data processing module, and wherein the control device modifies the assignment between the data objects of the first and the second data processing modules during ongoing operation, during which the control device is executing its control tasks and influences the process, in order to modify the process control, wherein:
 the first data processing module is a control program executed by the control device, the data objects of which are formed by program variables, and wherein one memory area in a data memory of the control device is reserved for each program variable during the execution of the control program, and wherein:
 the second data processing module is a communication interface of the control device for communication with process devices, the data objects of which are formed by process data objects managed by the operating program, and wherein one memory area in a data storage device of the control device is reserved for each process data object during the operation of the control device,
 wherein the assignments between the data objects of the data processing modules are determined in at least one of the assignments files saved in the control device, the same comprising a list of the respectively assigned data objects, and
 wherein:
 the current assignments file is transmitted from the control device to a separate operating device,
 the received assignments file is modified on the operating device,
 the modified assignments file is transmitted from the operating device back to the control device, and
 as a response to the receipt of the modified assignments file, the data objects can be assigned by the control device during ongoing operation according to the modified assignments file.

8. A non-transitory data storage device having, an operating program saved thereon, which executes a method when the operating program is executed on a control device, wherein the method is for process control, wherein the control device is connected to at least one process device, wherein at least one first and one second data processing module are executed by the control device during operation, wherein an operating program of the control device automatically implements an exchange of data between assigned data objects of the first and the second data processing module and wherein the assignment between the data objects of the first and the second data processing modules is modified during the operation of the control device in order to modify the process control, wherein the assignment between the data objects is modified while the control device is executing its control tasks and influences the process, wherein:
 the first data processing module is a control program executed by the control device, the data objects of which are formed by program variables, and wherein one memory area in a data memory of the control device is reserved for each program variable during the execution of the control program, and wherein:
 the second data processing module is a communication interface of the control device for communication with process devices, the data objects of which are formed by process data objects managed by the operating program, and wherein one memory area in a data storage device of the control device is reserved for each process data object during the operation of the control device,
 wherein the assignments between the data objects of the data processing modules are determined in at least one of the assignments files saved in the control device, the same comprising a list of the respectively assigned data objects, and
 wherein:
 the current assignments file is transmitted from the control device to a separate operating device,
 the received assignments file is modified on the operating device,
 the modified assignments file is transmitted from the operating device back to the control device, and
 as a response to the receipt of the modified assignments file, the data objects can he assigned by the control device during ongoing operation according to the modified assignments file.

* * * * *